Dec. 11, 1928.
J. L. GARFIELD
BILLING DEVICE
Filed Aug. 6, 1926
1,694,647
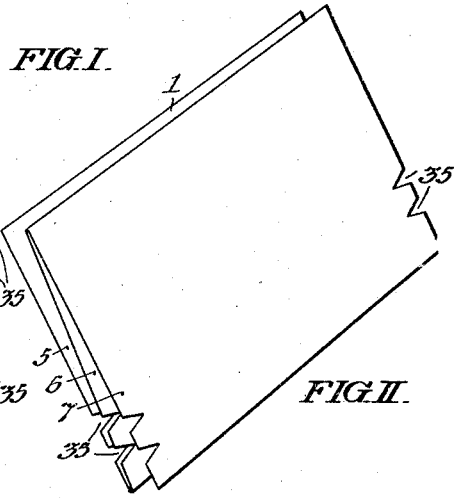
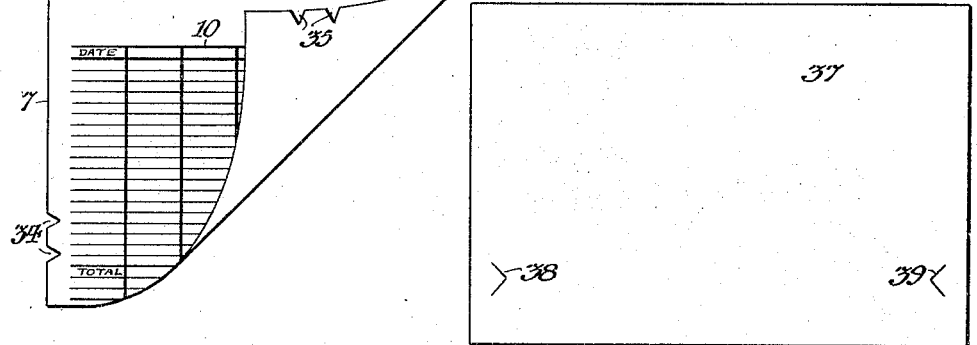
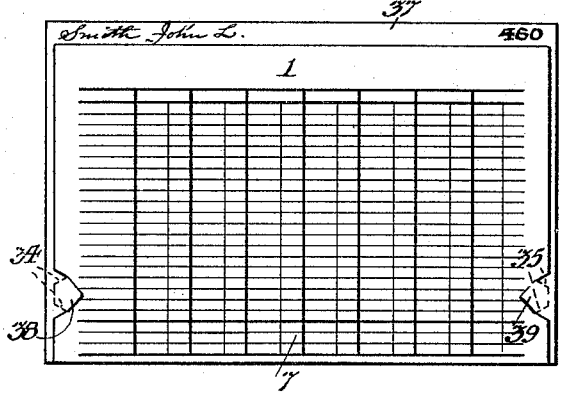
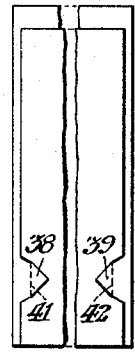
INVENTOR:
JAMES L. GARFIELD, Patented Dec. 11, 1928.

1,694,647

UNITED STATES PATENT OFFICE.

JAMES L. GARFIELD, OF DREXEL HILL, PENNSYLVANIA.

BILLING DEVICE.

Application filed August 6, 1926. Serial No. 127,544.

My invention is particularly designed for recording amounts to be charged to hotel guests, although not restricted to that specific use.

As hereinafter described, my invention includes a triplicate bill, conveniently formed of a single sheet of paper having, upon the same face thereof, similar printed forms upon the upper and lower thirds thereof, separated by a coating of transfer material covering substantially one-third of the length of the sheet; said sheet being foldable upon two perforated transverse lines dividing the sheet in three equal parts; the sheet being folded to present the lower printed form outermost and in registry with the similar form printed at the top of said sheet, but with the intermediate coated portion of the sheet presented with its coated face toward the form printed at the top of the sheet. When thus folded, any mark made upon the outermost form, printed at the bottom of the sheet, is transferred, in the same position, on the form printed at the top of the sheet. Each of the three sections of the sheet has notches, at respectively opposite edges thereof, and preferably two notches at each such edge, for engagement with filing means, conveniently a holder sheet of stiff paper having V-shaped tabs formed therein with points directed toward the center of the holder, in position to register with the notches in said bill.

My invention includes the various novel features of construction and arrangement hereinafter more definitely specified.

In said drawings; Fig. I is a plan view of a single sheet embodying my invention.

Fig. II is a perspective view of said sheet, folded in triple form, to show the three sections of said sheet.

Fig. III is a plan view showing a convenient form of holder for the folded sheet indicated in Fig. II.

Fig. IV is a plan view showing such a bill form as indicated in Fig. II detachably engaged with the holder indicated in Fig. III.

Fig. V is a plan view showing a bill form having single notches in opposite edges thereof, adapted for engagement with the holder shown in Fig. III.

As shown in Fig. I; a single sheet 1, of paper or other suitable fabric, is perforated in two lines 2 and 3 dividing said sheet in three sections 5, 6 and 7. Said sections 5 and 7 are printed with forms 9 and 10, which may be precisely alike, and which include appropriately designated spaces for entries. For instance, in the specimen illustrated, such spaces may be designated "Date", "Forward", "Transferred", "Room", "Restaurant", "Phones Local", "Phones L. D.", "Cash", "Valet", "Baggage", "Laundry", "Sundries", "Total", "Rebates", "Credits", "Forward to", and "Forward from". The intermediate section 6 of said sheet 1 is provided with a coating 12 of carbon compound or some other transfer material.

As shown in Fig. II; said sheet 1 is folded, in respectively opposite directions, upon its perforated lines 2 and 3, to present the section 7 uppermost and in registry with the section 5, with the intermediate section 6 presenting the coating 12 upon its surface in opposition to the printed surface of said section 5. The construction and arrangement aforesaid are such that any mark made upon the face of the section 7 will be copied upon the section 5 by transfer of the coating 12 from the intermediate section 6. Such marks are indicated at 15 to 31 inclusive in the spaces designated as above named.

Said section 7 is intended to be delivered to the hotel guest or other debtor when detached from the remainder of the sheet, by severance upon the dotted line 3. The section 5 is intended to be retained as the record of the hotel or other creditor. The section 6 may be detached from the section 5 at the line 2, and be discarded.

Said sheet 1 is conveniently provided with similar notches 34 and 35 upon opposite edges thereof; such notches being conveniently arranged in respective pairs with points extending inwardly with respect to the edge of the sheet. Such notches may be formed in the sheet 1 either before or after the latter is folded and preferably afterward.

As indicated in Fig. III; a holder 37 may be conveniently formed of a rectangular piece of stiff paper, or other suitable fabric, preferably slightly larger than the dimensions of the bill form shown in Fig. II and have tabs 38 and 39 formed in unitary relation therewith, including oppositely counterpart projections extending toward the center of the holder. I find it convenient to make said tabs 38 and 39 triangular and pointed, by cutting through the substance of said holder 37, upon lines the opposite ends of which are in right angular relation with each other, as best shown in Fig. III. It is to be noted that such cutting merely slits and does not remove any of the substance of said holder 37. The upper and lower edges of said tabs 38 and 39 may be respectively engaged with the pairs of notches 34 and 35, as indicated in Fig. IV. However, as shown in Fig. V, such tabs 38 and 39 may be respectively engaged with single notches 41 and 42 in the opposite edges of the bill form 7. In either case; said tabs overlap, and effect mutual wedging engagement of the holder and billing sheet, and thus detachably hold, the billing sheet 1, against accidental displacement in any direction.

Such holders 37 may be assembled in series in any suitable filing device, being merely employed to facilitate handling the billing sheets 1 aforesaid, and may be identified with the number of the room occupied by the guest to whom the charges entered thereon are made, or may be marked with the name of such debtor, or be otherwise distinctively identified, in any suitable manner and by any suitable means.

Therefore, I do not desire to limit myself to the precise details of construction and arrangement herein set forth, as it is obvious that various modifications may be made therein without departing from the essential features of my invention, as defined in the appended claims.

I claim:

1. A rectangular sheet, having pairs of V-shaped notches, in opposite edges thereof, each pair adapted to contemporaneously engage, between them, the same projecting element of filing means, and thus wedgingly engage said element at opposite edges thereof and prevent displacement of said sheet in any direction with reference to such filing means.

2. A rectangular sheet, having a folding line intermediate of opposite edges thereof and parallel with said edges, and pairs of V-shaped notches in the other opposite edges thereof, each pair adapted to contemporaneously engage, between them, the same element of filing means.

3. A rectangular sheet, having a folding line intermediate of opposite edges thereof and parallel with said edges, and V-shaped notches in the other opposite edges thereof, adapted to engage filing means; such notches being counterpart upon opposite sides of said folding line and adapted to register when said sheet is folded on said line; whereby the notched portions of said sheet primarily remote from each other are adapted to register with the same element of filing means.

4. A rectangular sheet, having two folding lines extending parallel with opposite edges thereof, dividing said sheet in three sections of equal dimensions, and V-shaped notches, in opposite edges of said sheet, in each of said sections, adapted to register when said sheet is folded on said lines, and to engage the same element of filing means.

5. A rectangular sheet, having pairs of open notches, in opposite edges thereof, adapted to wedgingly engage the same element of filing means; said notches being V-shaped.

6. A rectangular sheet, having pairs of V-shaped notches, in opposite edges thereof, adapted to engage, between them, the same element of filing means.

7. A rectangular sheet, having pairs of V-shaped notches, in opposite edges thereof, adapted to engage filing means; said notches being adapted to wedgingly engage a single tab between them.

8. The combination with a rectangular sheet, having V-shaped notches, in opposite edges thereof, adapted to engage filing means; of filing means in cooperative relation with said sheet including another sheet having tabs cut therein and within the opposite edges thereof, and adapted to overlap said first sheet in wedging engagement in the notches thereof, whereby said filing means detachably holds said sheet.

9. The combination with a rectangular sheet, having V-shaped notches, in opposite edges thereof, adapted to engage filing means; of filing means in cooperative relation with said sheet including another sheet having tabs cut therein and within the opposite edges thereof, and adapted to overlap said first sheet in the notches thereof; said tabs being V-shaped, and adapted for mutual wedging engagement of said sheet and filing means; whereby said filing means detachably holds said sheet.

10. A rectangular filing sheet having inwardly converging tabs cut therein and within the opposite edges thereof, and having their free edges extending oppositely toward the medial portion of said sheet.

11. A rectangular filing sheet having tabs cut therein and within the opposite edges thereof, and having their free edges extending oppositely toward the medial portion of said sheet; said tabs being V-shaped.

In testimony whereof, I have hereunto signed my name at Philadelphia, Pennsylvania, this 3d day of August, 1926.

JAMES L. GARFIELD.